United States Patent [19]

Hasegawa et al.

[11] Patent Number: 5,372,867
[45] Date of Patent: Dec. 13, 1994

[54] POLYESTER FILM FOR LAMINATED METAL SHEET DRAWING AND PROCESSING CONTAINING SOLID LUBRICANT AND HAVING SPECIFIED PROTRUSION RATE

[75] Inventors: Kinji Hasegawa, Hachioji; Tadashi Ono, Yokohama; Takeo Asai; Yoji Murakami, both of Sagamihara, all of Japan

[73] Assignee: Teijin Limited, Japan

[21] Appl. No.: 756,304

[22] Filed: Sep. 6, 1991

[30] Foreign Application Priority Data

Sep. 6, 1990 [JP] Japan .................... 2-234395
Mar. 25, 1991 [JP] Japan .................... 3-083018

[51] Int. Cl.$^5$ ............................................. B32B 3/00
[52] U.S. Cl. ................................ 428/141; 428/304.4; 428/323; 428/331; 428/458; 428/480
[58] Field of Search ............ 428/480, 331, 323, 304.4, 428/458, 910, 141

[56] References Cited

U.S. PATENT DOCUMENTS

| | | | |
|---|---|---|---|
| 4,461,797 | 7/1984 | Adachi et al. | 428/147 |
| 4,590,119 | 5/1986 | Kawaki et al. | 428/216 |
| 4,677,188 | 7/1987 | Utsumi et al. | 528/272 |
| 4,720,412 | 1/1988 | Katoh et al. | 428/141 |
| 4,725,472 | 2/1988 | Okabe et al. | 428/141 |
| 4,767,657 | 8/1988 | Sakamoto et al. | 428/143 |
| 5,071,690 | 12/1991 | Fukuda et al. | 428/141 |
| 5,094,924 | 3/1992 | Matsui et al. | 428/623 |
| 5,112,695 | 5/1992 | Watanabe et al. | 428/458 |

FOREIGN PATENT DOCUMENTS

| | | |
|---|---|---|
| 0312304 | 4/1989 | European Pat. Off. |
| 0415383 | 3/1991 | European Pat. Off. |
| 0415383 | 6/1991 | European Pat. Off. |
| 3219240 | 12/1982 | Germany |
| 58-67448 | 4/1983 | Japan |
| 2-208039 | 8/1990 | Japan |
| 2087302 | 5/1982 | United Kingdom |
| 2177045 | 1/1987 | United Kingdom |
| 2238507 | 6/1991 | United Kingdom |

*Primary Examiner*—H. Thi Lê
*Assistant Examiner*—Paul J. Thibodeau
*Attorney, Agent, or Firm*—Wenderoth, Lind & Ponack

[57] ABSTRACT

A polyester film for metal sheet lamination processing which comprises a co-polyester containing a lubricant having an average particle diameter of 2.5 μm or less and the co-polyester having a melting point of 210° to 245° C.; and wherein the refractive index in the direction of film thickness is 1.505 to 1.550, the refractive index in the direction of the film plane is 1.61 to 1.66 about all directions, subpeak by DSC is 150° to 205° C., and optionally, protrusions on the film surface satisfy the formula $$0.1 \leq Nd/N \leq 0.5$$

wherein N is the number of all the protrusions on the film surface and Nd is the number of the protrusions each containing the lubricant as its nucleus and having a sunk hollow around it.

2 Claims, 3 Drawing Sheets

POLYESTER FILM FOR LAMINATED METAL SHEET DRAWING AND PROCESSING CONTAINING SOLID LUBRICANT AND HAVING SPECIFIED PROTRUSION RATE

This invention relates to a polyester film for metal sheet lamination drawing and processing. More detailedly, this invention relates a polyester film for metal sheet lamination drawing and processing which, when it is laminated on a metal sheet and the laminate is processed for can preparation, for example by drawing, exhibits excellent drawability and processability, and from which metal cans such as beverage cans and food cans excellent in heat resistance and aroma retaining properties can be prepared.

Coating is generally made on metal cans for the prevention of corrosion of the inner and outer faces. Recently, methods to obtain rust resistance without coating used any organic solvents have been developed for purposes of the simplification of processes, the enhancement of sanitary aspects, the prevention of environmental pollution, etc., and as one of them covering with a thermoplastic resin film is being tried. Namely, a method is being investigated which comprises laminating a thermoplastic resin film on a sheet of metal such as tin plate, tin free steel or aluminum and then preparing cans by drawing, etc. As this thermoplastic resin film polyolefin films and polyamide films are tried to be used, but they cannot satisfy all of drawability and processability, heat resistance and flavor retaining properties.

On the other hand, polyester films particularly polyethylene terephthalate film drew attention as a film having balanced characteristics, and several methods to utilize these films are proposed. Namely, (A) a method which comprises using as a can-preparing material a laminate obtained by laminating biaxially oriented polyethylene terephthalate film on a metal sheet through an adhesive layer (Japanese Laid-Open Patent Publication Nos. 10451/1981 and 192546/1989);

(B) a method which comprises using as a can-preparing material a laminate obtained by laminating on a metal sheet an amorphous or very low crystalline aromatic polyester film (Japanese Laid-Open Patent Publication Nos. 192545/1989 and 57339/1990); and (C) a method which comprises using as a can-preparing material a laminate obtained by laminating on a metal sheet a thermofixed biaxially low oriented polyethylene terephthalate film (Japanese Laid-Open Patent Publication No. 22530/1989).

However, according to investigation by the present inventors, it was revealed that sufficient characteristics cannot be obtained according to any of the above proposals and they have the following drawbacks, respectively As for the method (A), since the biaxially oriented polyethylene terephthalate film is excellent in heat resistance and flavor retaining properties but drawability and processability are insufficient, the whitening (generation of minute cracks) and breaking of the film occur in can preparation processing accompanied by large deformation.

As for the method (B), the amorphous or very low crystalline aromatic polyester film is good in drawability and processability, but is poor in flavor retaining properties and easily embrittles by printing after the can preparation or after treatments such as retort sterilization treatment and thus is liable to be cracked by impact from the outside of the can.

The method (C) aims at exerting its effects in a region between the above (A) and (B), but the film does not yet reach low orientation applicable to can preparation processing. Moreover, since the isotropy of the film plane it not guaranteed, drawability and processability are sometimes insufficient in the specific direction of the film when deformation for all directions is made as in can preparation processing (deep drawing).

The object of this invention lies in developing a polyester film for can preparation processing free of the above drawbacks.

According to this invention is provided a polyester film for metal sheet lamination drawing and processing which comprises a co-polyester containing a lubricant having an average particle diameter of 2.5 $\mu$m or less and the co-polyester higher melting point (hereinafter melting point); of 210° to 245° C.; and wherein the refractive index in the direction of film thickness is 1,505 to 1,550, the refractive index in the direction of the film plane is 1.61 to 1.66 about all directions, lower melting point (hereinafter subpeak) determined by Differential Scanning Colorimetry hereinafter DSC) of 150 to; 205° C., and preferably, protrusions on the film surface satisfy the formula $$0.1 \leq Nd/N \leq 0.5$$

wherein N is the number of all the protrusions on the film surface and Nd is the number of the protrusions each containing the lubricant as its nucleus and having a sunken hollow around it.

This invention is described below referring to the attached drawings.

FIG. 2 is the plan view (A) and cross section (B) of the polyester film of the invention, and protrusions are shown each containing a particle as its nucleus and having a sunk hollow around it.

FIG. 3 is the plan view (A) and cross section (B) of the lubricant-containing polyester film prepared by a conventional method, and it is shown that hollows do not exist around the protrusions.

As a representative example of co-polyester in the invention a polyethylene terephthalate copolymer is mentioned. This copolyester component can be its acid component or alcohol component. Examples of the acid component include aromatic dibasic acids such as isophthalic acid, phthalic acid and napthalenedicarboxylic acid; aliphatic dicarboxylic acids such as adipic acid, azelaic acid, sebacic acid and decanedicarboxylic acid; alicyclic dicarboxylic acids such as cyclohexanedicarboxylic acid; etc. On the other hand, examples of the alcohol component include aliphatic diols such as butanediol and Lexanediol; and alicyclic diols such as cyclohexanedimethanol; etc. These can be used alone or in a combination of two or more.

The ratio of the copolymerization components varies depending on their kinds, but is a ratio such that the melting point of the resulting polymer is in the range of 210° to 245° C., preferably 215° to 240° C., more preferably 220° to 235° C. A polymer whose melting point is below 210° C. is poor in heat resistance and cannot withstand the heating in printing after the can preparation. On the other hand, a polymer whose melting point is above 245° C. has too large crystallinity and is thus poor in drawability and processability The melting point of co-polyesters is measured by the method to determine melting peak with a temperature elevation speed of 20° C./minute, using a Du Pont Instruments 910 DSC. In this connection the sample amount is about 20 mg.

The co-polyester in the invention contains a lubricant having an average particle diameter of 2.5 μm or less. This lubricant can be any of an inorganic one and an organic one, but an inorganic one is preferred. Examples of the inorganic lubricant include silica, alumina, titanium dioxide, calcium carbonate, barium sulfate, etc., and examples of the organic lubricant include silicone particle, etc. Any of the lubricants is required to have an average particle diameter of 2.5 μm or less. When the average particle diameter of the lubricant goes beyond 2.5 μm, there is a fear that pinholes occur or in some case breaking occurs in those please, as a result of the matter that large lubricant particles (for example particles of 10 μm or more at the film part deformed by processing such as deep drawing can preparation acted as a starting point.

A lubricant preferred particularly in the point of pinhole resistance is a monodisperse lubricant having an average particle diameters of 2.5 μm or less and a particle size ratio (major axis/minor axis) of 1.0 to 1.2. Examples of such a lubricant include genuinely spherical silica, genuinely spherical titanium oxide, genuinely spherical zirconium, genuinely spherical silicone particles, etc.

The average particle diameter and particle size ratio of the spherical monodisperse lubricant can be calculated by vapor depositing a metal on the particle surface, measuring, first, the major axis, minor axis and area circle correspondence diameter from the image of the resulting particles enlarged, for example 10,000 to 30,000 fold by an electron microscope, and then applying the values to the following equation.

Average particle diameter = Total of the area circle correspondence diameter of the measured particles/Number of the measured particles Particle size ratio = Average major axis of the particles/Average minor axis of the particles Further, the spherical lubricant particles desirably have a sharp particle diameter distribution, and preferably, relative standard deviation indicating the sharpness of the distribution is 0.5 or less, particularly 0.3 or less.

This relative standard deviation is represented by the following equation.

$$\text{Relative standard deviation} = \sqrt{\frac{\sum_{i=1}^{n}(Di - \hat{D})^2}{n}} / \hat{D}$$

wherein Di represents the area circle correspondence diameter (μm) of each particle, $\overline{D}$ represents an average value of the area circle correspondence diameter $$\left(= \frac{\sum_{i=1}^{n} Di}{n}\right)(\mu m), \text{ and}$$

n represents the number of the particles.

Preferably, the amount of the lubricant in the co-polyester is determined by winding efficiency in the film preparation process. Generally, it is preferred that in case of a lubricant having a large particle diameter a small amount thereof is added, whereas in case of a lubricant having a small particle diameter a large amount thereof is added. For example, it is preferred that in case of silica having an average particle diameter of 2.0 μm the silica of the order of 0.05 wt.% is added and in case of titanium dioxide having an average particle diameters of 0.3 μm the titanium dioxide of the order of 0.3 wt.% is added. Further, it is also possible to make the film opaque by intentionally adjusting the content of the lubricant. For example, it is possible to give a white film by adding 10 to 15 wt.% of titanium dioxide.

The co-polyester of the invention is not limited by preparation processes. For example, preferably used is a process which comprises subjecting terephthalic acid, ethylene glycol and a copolymerizable component to esterification reaction and then subjecting the reaction product to polycondensation reaction to give a copolyester, or a process which comprises subjecting dimethyl terephthalate, ethylene glycol and a copolymerizable component to transesterification reaction and then subjecting the resulting reaction product to polycondensation reaction to give a co-polyester. In the preparation of the co-polyester, it is also possible to add, if necessary, other additives such as, for example, an antioxidant, a heat stabilizer, an ultraviolet absorber and an antistatic agent.

The polyester film of the invention can be obtained by melting the above lubricant-containing copolyester, discharging the molten copolymer from the die to mold into film, biaxially stretching the film and thermosetting the film. The resulting film is required to satisfy the following requisites (1), (2) and (3).

(1) The refractive index in the direction of the thickness of the film is 1.505 to 1,550, preferably more than 1.510 and 1.540 or less, and further preferably more than 1.515 and 1,530 or less. When this refractive index is below 1.505, drawability and processability become insufficient, whereas in case of the refractive index more than 1.550 (i.e., in case of excessively low orientation) the film takes a structure close to amorphous structure and thus becomes insufficient in heat resistance (2) The refractive index in the direction of the film plane is within 1.61 to 1.66, preferably 1.615 to 1.655, about all directions. In deep drawing and drawing-ironing processing often used in can preparation processing, the deformation of the film must be made uniformly over all directions. In a direction where the refractive index in the direction of the film plane is below 1.61 drawability and processability are good but heat resistance is poor, whereas in a direction where the refractive index in the direction of the film plane is above 1.66 drawability and processability are poor and thus the whitening or breaking of the film occurs at the time of deep drawing processing.

In this connection, the refractive indexes in the direction of the film thickness and in the direction of the film plane are measured as follows.

A polarizing plate analyzer is attached at the ocular side of an Abbe's refractometer, each refractive index is measured with a monolight Na D ray. Methylene iodide is used as a mount liquid and measurement temperature is 25° C. The measurement of the refractive index in the direction of thickness and the refractive index in the direction of the plane was made about the end part of the sample cut out symmetrically to the center of the stretching and in a length corresponding to 80% of the film width, from the released film after the thermosetting.

(3) A subpeak by DSC is 150° to 205° C., preferably 160° to 200° C., more preferably 170 to 195° C.

The polyester film of the invention is laminated with heating on a metal sheet. Thus, it is necessary to control the subpeak temperature of DSC in the above range in order to ensure the quality stability of the film after the lamination.

The quality of the film after can preparation becomes satisfactory only by adjusting the lamination temperature and subpeak temperature at the time of lamination with heating. When the subpeak temperature goes beyond 205° C., the film breaks at the time of can preparation even if the lamination temperature is adjusted to any temperature. On the other hand in case where the subpeak temperature is below 150° C., the film at the can bottom part deformed in a small degree is embrittled when the lamination temperature is raised, and the film at the upper part of the can side deformed in a large degree breaks when the lamination temperature is lowered, and thus even by the adjustment of the lamination temperature good cans cannot be made.

Figure 1:
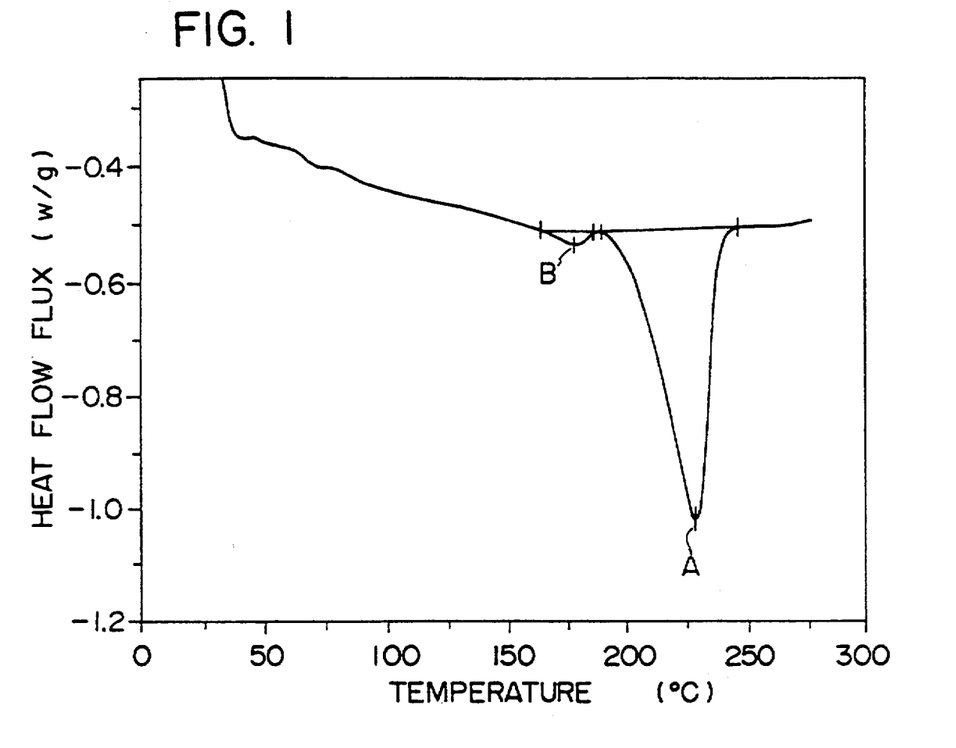
FIG. 1 is a chart of the DSC measurement of the film, and the subpeak and melting point peak are shown.

The subpeak temperature is measured according to the same method and conditions as in the measurement of the melting point of co-polyesters. Namely, the subpeak is measured at a temperature elevation speed of 20° C./minute using a Du Pont Instruments 910 DSC. The amount of the film sample is about 20 mg. The relation between the subpeak temperature and the melting point may be understood, for example from FIG. 1. In FIG. 1, A is the melting point and B is the subpeak temperature.

In order to obtain the film of the invention satisfying the above requisites (1) to (3), it is suitable to carry out stretching and heating treatment in the biaxial stretching treatment, particularly in the successive biaxial treatment at a longitudinal stretching ratio of 2.5 to 3.6-fold, at a transverse stretching ratio of 2.7 to 3.6-fold and at a thermosetting temperature of 150° to 230° C. Further preferably, it is suitable to carry out the biaxial stretching and thermosetting treatments under conditions, among the above conditions, such that the refractive index in the direction of the thickness is 1.505 to 1,550, the refractive index distribution of the film plane is 1.61 to 1.66 and the subpeak by DSC is 150° to 205° C. Particularly in order to control the refractive index distribution (the maximum value and minimum value of the refractive index) there can be used a method disclosed in Japanese Laid-Open Patent Publication Nos. 160122/1983, 115812/1984, 114028/1984, etc. or a method described below.

The co-polyester is melting extruded into a sheet, the sheet is rapidly cooled into a nonstretched film and the nonstretched film is heated by roller heating, infrared ray heating or the like and longitudinally stretched to give a longitudinally stretched film. Preferably, this stretching is carried out utilizing the peripheral speed difference between two or more rollers. It is preferred that the stretching temperature is a temperature higher than the glass transition temperature (Tg) of the co-polyester, particularly a temperature higher by 20° to 40° C. than Tg. The stretching ratio depends, e.g. on the physical properties of the final film, but is preferably 2.5-fold or more. More preferably, this ratio is 3.6-fold or less.

The longitudinally stretched film is then successively tranverse stretched, thermoset and thermorelaxed to give a biaxially stretched film, and these treatments are carried out running the film. The transverse stretching treatment is started from a temperature higher by 20° C. or more than the glass transition temperature (Tg) of the co-polyester, and continued with temperature elevation up to a temperature lower by 120° to 30° C. than the melting point (Tm) of the co-polyester. Preferably, this stretching start temperature is (Tg +40° C.) or less, and for example in case of 12 mole % isophthalic acid-copolymerized polyethylene terephthalate it is preferred that the temperature is within a range of 73° to 113° C. Further, it is preferred that the stretching maximum temperature is a temperature lower by 100° to 40° C. than Tm.

Temperature elevation in the course of transverse stretching may be either continuous or stepwise (successive). Usually, successive temperature elevation is adopted. For example, the transverse stretching zone of the stenter is plurally divided along the film running direction and each zone is separately heated by flowing a heating medium having a predetermined temperature across the zone. When the transverse stretching start temperature is too low, the slitting of the film, undesirably, occurs. Further when the stretching maximum temperature is lower than (Tm-120)° C, the thermoshrinkage of the film enlarges and the rate of uniformity of the physical properties in the width direction becomes small, undesirably. On the other hand when the stretching maximum temperature is higher than (Tm-30)° C., the film softens and the slitting of the film occurs by disturbance on the like, undesirably.

The ratio of transverse stretching depends on the physical properties of the final film, but is preferably 2.7-fold or more, particularly 3.0-fold or more. It is preferred that this ratio is further 3.6-fold or less.

The thermosetting treatment is carried out successively to the transverse stretching, and started at the temperature at the time of completion of the transverse stretching, and continued with temperature elevation up to a temperature of (Tm-20)° C. or less while the film is stretched by 2 to 20% in the direction of the film width. This stretching is usually referred to as toe-out and preferably 5 to 15%. Further, the difference between the temperature at the time of completion of the thermosetting and the temperature at the time of start of the thermosetting is preferably 40° C. or less, particularly 30° C. or less. Further, this temperature difference may be only 1° C. in some case, but is preferably 5° C. or more, particularly 10° C. or more. Stretching in the thermosetting less than 5% is not desirable because the region of isotropy in the film width direction becomes small. On the other hand, the stretching more than 20% is not desirable because not only thermoshrinkage in the transverse direction is greatly enlarged, but the breaking of the film is liable to occur.

The film subjected to the thermosetting treatment is once cooled to a temperature equal to or less than the glass transition temperature (Tg) of the copolyester, the end part of the film is slitted with a predetermined width, and the resulting film is subjected, if necessary, to thermorelaxation treatment.

The thermorelaxation treatment is carried out at a temperature of (Tg+30) to (Tg+80)° C. for 0.3 to 20 seconds without restraining the film width direction and under a low running tension of 4 to 10 kg/cm². The thickness of the film to be provided to this thermorelaxation treatment is preferably 6 to 75 μm, particularly 10 to 75 μm. Further, the width of the film is preferably 1 m or more. For example in case of an isophthalic acid-12 mole % copolymerized polyester, the above treatment temperature is about 103° to 153° C. Preferably, the thermorelaxation treatment is carried out using a heating and surfacing treatment apparatus. A heated inert gas, particularly heated air is preferably used as a medium heating and surfacing the film. By this heating and surfacing treatment, it becomes possible to carry out the thermorelaxation treatment effectively while stable film running is maintained.

It is preferred that the polyester film of the invention satisfies, in addition to the above requisites (1), (2) and (3), a condition (4) that the number of protrusions on the film surface each containing the lubricant as a nucleus and having a sunken hollow around it is more than 10% and 50% or less, preferably more than 15% and 45% or less, more preferably more than 20% and 40% or less based on the total raised protrusion number. These "protrusions each containing the lubricant as a nucleus and having a sunk hollow around it" (hereinafter sometimes referred to as "protrusions each having a hollow") is formed by the stretching treatment, and differ from unevenness formed, for example, by satin processing.

The film wherein the number of protrusions each having a hollow is less than 10% is liable to break at the time of can preparation and is poor in resistance to impact crack. On the other hand, the film wherein the number of the protrusions portions goes beyond 50% is difficult to make. Namely, caliper variation intensely occur at the time of the first stretching, stair-stepped spots clearly appear after the second stretching, and thus the uniformity of quality is spoiled.

Figure 2A:
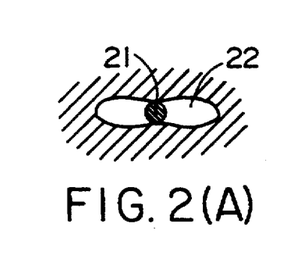
Figure 2B:
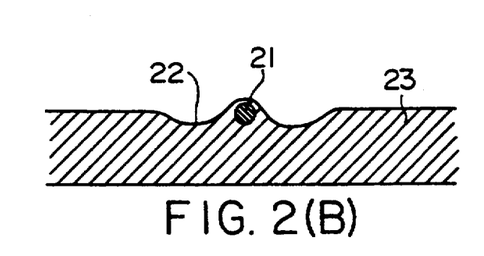
Figures 3A, 3B:
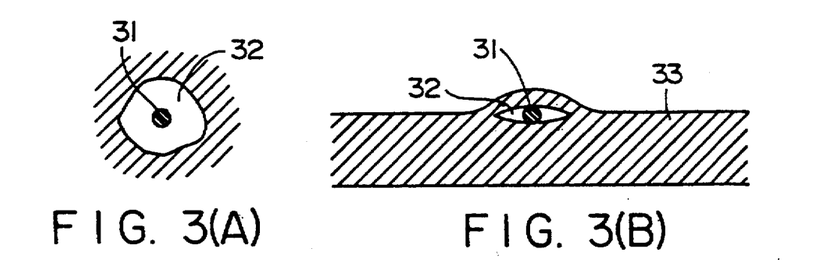
Figure 4:
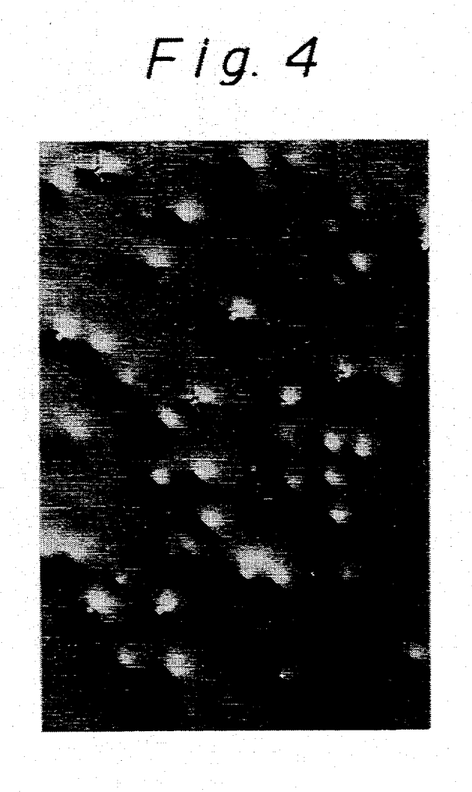
FIG. 4 is a differential interference microphotograph (magnification : 650-fold) showing the surface of the lubricant-containing polyester film prepared by a conventional method
Figure 5:
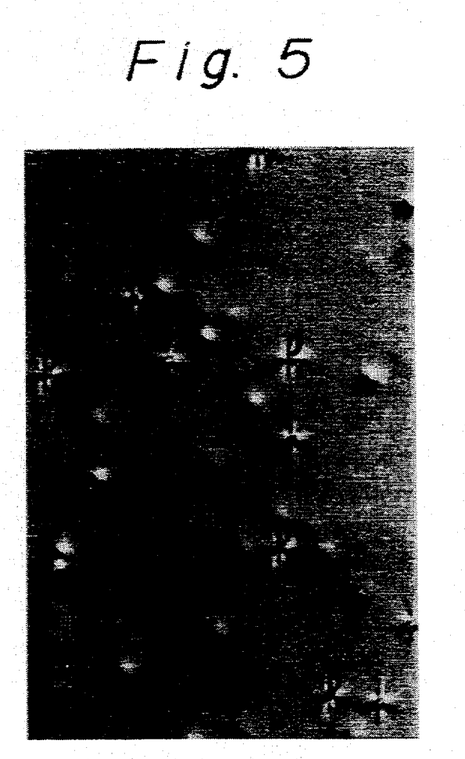
FIG. 5 is a differential interference microphotograph (magnification : 650-fold) showing the surface of the polyester film of the invention.

A protrusion having a hollow is shown in FIG. 2. In FIG. 2, (A) is a plan view, (B) is a cross section, and 21, 22 and 23 are the lubricant, the hollow and the film layer, respectively. On the other hand, a protrusion having no hollow (usual raised portion) is shown in FIG. 3. In FIG. 3, (A) is a plan view, (B) is a cross section, and 31, 32 and 33 are the lubricant, a void and the film layer, respectively. Further, the enlarged photographs of the film surface are shown in FIGS. 4 and 5. In FIG. 4 the protrusions of film surface are composed c:,f usual protrusions alone, and in FIG. 5 the protrusions of the film surface are composed of usual protrusions and protrusions each having a hollow. As an example of methods to prepare a film satisfying the above requisites (1), (2), (3) and (4), a method by biaxial stretching, particularly successive biaxial stretching is described below, but this is not the sole method therefor in the invention.

As described above, the co-polyester is molten, discharged from the die to mold it into a film, and the film is immediately rapidly cooled to give a substantially amorphous co-polyester sheet. This sheet is then heated by roller heating, infrared ray heating or the like and longitudinally stretched. At that time, it is preferred to adjust the stretching temperature to a temperature higher by 30° to 50° C. than the glass transition temperature (Tg) of the co-polyester and adjust the stretching ratio to 2.5 to 3.5-fold. It is preferred that stretching in the transverse direction is started from a temperature higher by 20° C. or more than Tg and continued with temperature elevation up to a temperature lower by 80° to 130° C. than the melting point (Tm) of the co-polyester. It is preferred to make the ratio of transverse stretching 2.7 to 3.6-fold. Further, in order to adjust the quality of the film in accordance with the Tm of the co-polyester, the temperature of thermosetting is selected in the range of 150° to 205° C. The temperature of thermosetting corresponds to the subpeak temperature of DSC.

Among the above film preparation conditions, by heightening the stretching temperature and lowering the stretching ratio, the number of protrusions each having a hollow as described in the above (4) increases. At the same time, by lowering the orientation without enlarging the difference in physical properties in the transverse direction, a film excellent in drawability can be obtained.

The object of this invention is attained for the first time after all the above requisites were satisfied about the lubricant, the melting point of the co-polymer, the refractive index of the film in the direction of thickness, the refractive index of the film in the direction of the plane and the subpeak temperature by DSC and preferably protrusions. For example, even if the requisites about the lubricant, the refractive index of the film in the thickness direction, the refractive index of the film in the plane direction and the subpeak temperature by DSC and preferably protrusions are satisfied, when the polyester is a polyethylene terephthalate homopolymer having a high melting point, a good can preparation processing property (deep drawing property) cannot be obtained. Further, when the average particle diameter of the lubricant goes beyond 2.5 μm, even if other requisites are satisfied, pinholes occur and become a cause of troubles. Further, when the subpeak temperature by DSC is out of the range of 150° to 205° C., even if other requisites are satisfied, good can qualities cannot be obtained.

The intrinsic viscosity of the polymer part of the film is 0.52 to 0.80, preferably 0.54 to 0.70, particularly preferably 0.57 to 0.65. In case where the intrinsic viscosity is below 0.52, even if other physical properties are appropriate and lamination on a metal sheet and can preparation processing by deep drawing are carried out satisfactorily, the film becomes liable to embrittle and by impact from the outside of the can liable to split, by retort treating the can after the filling up of contents for sterilization or by later long-term preservation. On the other hand, the polymer having an intrinsic viscosity beyond 0.80 is excess in quality and the productivity of the raw material polymer is lowered, and thus such a polymer is not economical. In this connection, the intrinsic viscosity is a value measured at 25° C. using o-chlorophenol as a solvent.

The thickness of the polyester film of the invention is preferably 6 to 75 μm, more preferably 10 to 75 μm, most preferably 15 to 50 μm. When the thickness is below 6 μm, slitting, etc. are liable to occur at the time of processing, whereas the film having a thickness of 75 μm or more is excess in quality and uneconomical.

As can-preparing metal sheets on which the polyester film of the invention is laminated are suitable sheets of tin plate, tin-free steel, aluminum, etc. The lamination of the polyester film on the metal sheet can be carried out, for example by the following methods ① and ②.

① The film is laminated on the metal sheet previously heated to a temperature equal to or more than the melting point of the film, and the laminate is rapidly cooled to make amorphous the surface layer part (thin layer part) of the film contacting with the metal sheet and thereby make the surface layer adhere onto the metal sheet.

② The film is previously primer coated with an adhesive layer and the face is laminated on the metal sheet. Examples of the adhesive layer include known resin adhesives such as, for example, epoxy adhesives, epoxy-ester adhesives and alkyd adhesives.

This invention is further described below according to examples.

Examples 1 to 4 and Comparative examples 1 to 3

A polyethylene terephthalate copolymer (intrinsic viscosity 0.60) wherein the component indicated in Table 1 had been copolymerized and which contained spherical monodisperse silica having an average particle diameter of 1.5 μm or 2.0 μm (particle size ratio 1.07, relative standard deviation 0.1) was melting extruded at the temperature indicated in the table and solidified with rapid cooling to obtain a nonstretched film.

This nonstretched film was then longitudinally stretched, transverse stretched and thermoset, under the conditions indicated in the table, to obtain a biaxially oriented film having a thickness of 25 μm.

The characteristics of this film are shown in Table 4.

stretched film. The nonstretched film was successively biaxially stretched under the conditions of a longitudinal stretching temperature of 100° C., a longitudinal stretching ratio of 3.0-fold, a transverse stretching start temperature of 110° C., a transverse stretching completion temperature of 160° C. and a transverse stretching ratio of 3.1-fold, and then thermoset under the conditions of a temperature of 190° C. and an elongation rate of 10%.

The characteristics of the resulting biaxially oriented film are shown in Table 4.

TABLE 2

|  | Lubricant (μm) | Average particle diameter (%) | Addition amount |
|---|---|---|---|
| Example 5 | Titanium dioxide | 0.3 | 0.3 |
| Comparative Example 4 | Massive silica | 2.7 | 0.05 |

Comparative examples 5 to 9

A polyethylene terephthalate copolymer (melting point 229° C., intrinsic viscosity 0.60) wherein 12 mole % of isophthalic acid had been copolymerized and which contained 0.05 wt.% of spherical monodisperse silica having an average particle diameter of 2.0 μm (particle size ratio 1.07, relative standard deviation 0.1) was melting extruded at 280° C. and solidified with rapid cooling to obtain a nonstretched film. This nonstretched film was longitudinally stretched, transverse stretched and then thermoset, under the conditions indicated in Table 3, to obtain a biaxially oriented film.

TABLE 1

|  | Copolymer component composition | Lubricant characteristic and addition amount | Melt extrusion temperature (°C.) | Longitudinal stretching conditions Temperature (°C.) | Ratio | Transverse stretching conditions Temperature (°C.) | Ratio | Thermosetting completion temperature (°C.) | Thermosetting elongation rate (%) |
|---|---|---|---|---|---|---|---|---|---|
| Example |  |  |  |  |  |  |  |  |  |
| 1 | Isophthalic acid 12 mol % | 1.5 μm silica 0.1% | 280 | 100 | 3.0 | 110→160 | 3.1 | 190 | 7.5 |
| 2 | Sebacic acid 12 mol % | 1.5 μm silica 0.1% | " | 90 | " | 110→160 | " | 190 | 7.5 |
| 3 | Isophthalic acid 9 mol % | 2.0 μm silica 0.05% | 290 | 105 | 3.1 | 115→170 | 3.2 | 200 | 7.5 |
| 4 | Sebacic acid 9 mol % | 2.0 μm silica 0.05% | " | 95 | " | 105→170 | " | " | 7.5 |
| Comparative Example |  |  |  |  |  |  |  |  |  |
| 1 | None | 2.0 μm silica 0.05% | " | 105 | 2.5 | 115→170 | 2.8 | 235 | 15 |
| 2 | Isophthalic acid 5 mol % | 2.0 μm silica 0.05% | " | " | 2.8 | 115→170 | 2.9 | 220 | 10 |
| 3 | Isophthalic acid 22 mol % | 2.0 μm silica 0.05% | 260 | 95 | 3.3 | 105→150 | 3.4 | 170 | 5 |

*"Start temperature→Completion temperature" about the transverse stretching is indicated.

Example 5 and Comparative example 4

A polyethylene terephthalate copolymer (intrinsic viscosity 0.60) wherein 12 mole % of isophthalic acid had been copolymerized and which contained the lubricant indicated in Table 2 was melting extruded at 280° C. and solidified with rapid cooling to obtain a non- In this case a method for making the film isotropic was not adopted and usual successive biaxial stretching was conducted.

The characteristics of this film are shown in Table 4.

TABLE 3

| Comparative example | Longitudinal stretching conditions | | Transverse stretching conditions | | Thermo-setting temperature (°C) |
|---|---|---|---|---|---|
| | Temperature (°C) | Ratio | Temperature (°C) | Ratio | |
| 5 | 100 | 3.0 | 110 | 3.1 | 210 |
| 6 | " | 3.6 | " | 3.7 | 180 |
| 7 | " | 2.5 | " | 3.5 | " |
| 8 | " | 3.0 | " | 3.8 | " |
| 9 | " | 3.0 | " | 3.1 | 140 |

Each of 14 films in total obtained in Examples 1 to 5 and Comparative examples 1 to 9 were laminated on the both sides of tin-free steel 0.25 mm thick heated to 260° C., the laminate was cut out into a circular sheet having a diameter of 150 mm after water cooling, and the circular sheet was subjected to two-stage deep drawing processing using a drawing die and a punch to make a side seamless vessel (hereinafter abbreviated as can) having a diameter of 55 mm.

This can was subjected to the following observations and tests and evaluated according to the following criteria (1) Deep drawing processability-1

◯: In both inner and outer faces processing is carried out without any abnormality about the film, and whitening and breaking are not observed about the film of both inner and outer faces of the can.

△: Whitening is observed about the film at the upper part of both inner and outer faces of the can. X: Film breaking is observed at a part of the film of both inner and outer faces of the can.

(2) Deep drawing processability-2

◯: There is no abnormality about the film of both inner and outer faces, and the measured value in a rust resistance test about the film face inside the can (hereinafter abbreviated as the ERV test) (an electric current value measured when aqueous 1% NaCl is placed in the can, an electrode is inserted and 6 V of voltage given using the can itself as an anode) is 0.2 mA or less.

X: There is no abnormality about the film of both inner and outer faces, but the measured value in the ERV test is 0.2 mA or more, and when the electrified part is observed with enlargement, pinhole-like cracks with the large lubricants as the starting point are observed about the film.

(3) Impact crack resistance

The measured value when the ERV test inside the can was carried out after 10 per each test of finely deep drawing molded cans were filed with water and dropped on a polyvinyl chloride tile floor from the height of 1 m is ◯: 0.2 mA or less about all the ten cans △: 0.2 mA or more about 1 to 5 cans X: 0.2 mA or more about 6 or more cans, or cracks of the film are already observed at the time after the dropping.

(4) Heat embrittlement resistance

The measured value when finely deep drawing molded cans were held with heating at 210° C. for 5 minutes and then the impact crack resistance evaluation described in (3) was conducted is ◯: 0.2 mA or less about all the ten cans △: 0.2 mA or more about 1 to 5 cans X: 0.2 mA or more about 6 or more cans, or cracks of the film are already observed at the time after the heating at 210° C. for 5 minutes.

The results of the 4 evaluations are shown in Table 4.

TABLE 4

| | Melting point (°C) | Average particle diameter of the lubricant (μm) | Refractive index in the direction of the film thickness | Refractive index in the direction of the film plane Max value/Min value | Subpeak by DSC (°C) | Deep drawing processability | | Impact crack resistance | Heat embrittlement resistance | Integrated evaluation |
|---|---|---|---|---|---|---|---|---|---|---|
| | | | | | | 1 | 2 | | | |
| Example | | | | | | | | | | |
| 1 | 229 | 1.5 | 1.518 | 1.645/1.635 | 187 | ◯ | ◯ | ◯ | ◯ | ◯ |
| 2 | 229 | 1.5 | 1.515 | 1.645/1.625 | 188 | ◯ | ◯ | ◯ | ◯ | ◯ |
| 3 | 235 | 2.0 | 1.516 | 1.648/1.625 | 198 | ◯ | ◯ | ◯ | ◯ | ◯ |
| 4 | 235 | 2.0 | 1.512 | 1.649/1.627 | 197 | ◯ | ◯ | ◯ | ◯ | ◯ |
| 5 | 229 | 0.3 | 1.518 | 1.644/1.635 | 187 | ◯ | ◯ | ◯ | ◯ | ◯ |
| Comparative Example | | | | | | | | | | |
| 1 | 260 | 2.0 | 1.518 | 1.653/1.645 | 233 | X | | Not measured | | X |
| 2 | 247 | 2.0 | 1.519 | 1.655/1.643 | 215 | △ | | Not measured | | X |
| 3 | 208 | 2.0 | 1.535 | 1.645/1.627 | 167 | ◯ | ◯ | ◯ | X | X |
| 4 | 229 | 2.7 | 1.528 | 1.642/1.637 | 187 | ◯ | X | Not measured | | X |
| 5 | 229 | 2.0 | 1.547 | 1.641/1.619 | 208 | X | | Not measured | | X |
| 6 | 229 | 2.0 | 1.501 | 1.655/1.642 | 178 | X | | Not measured | | X |
| 7 | 229 | 2.0 | 1.515 | 1.655/1.608 | 177 | ◯ | ◯ | △ | X | X |
| 8 | 229 | 2.0 | 1.512 | 1.662/1.635 | 178 | △ | | Not measured | | X |
| 9 | 229 | 2.0 | 1.518 | 1.642/1.633 | 138 | ◯ | ◯ | △ | Not measured | X |

From the results in Table 4, it is seen that the films of Examples are excellent in all of deep drawing processability, impact crack resistance and heat resistance.

Further, the heating temperature of the tin-free steel was variously changed about the films of comparative examples 5 and 9, but no region wherein "good" integrated evaluation was obtained was found even when the heating temperature was raised on lowered.

Examples 6 to 9 and Comparative examples 10 and 12

A polyethylene terephthalate copolymer (intrinsic viscosity 0.67) wherein the component indicated in Table 5 had been copolymerized and which contained 0.1 wt. % of spherical monodisperse silica having an average particle diameter of 1.5 μm (particle size ratio 1.07, relative standard deviation 0.1) was melting extruded at the temperature indicated in the table and solidified with rapid cooling to obtain a nonstretched film.

This nonstretched film was then longitudinally stretched, transverse stretched and then thermoset, under the conditions indicated in the table, to obtain a biaxially oriented film having a thickness of 25 μm. Characteristics of this film are shown in Table 9.

of spherical monodisperse silica having an average particle diameter of 1.5 μm (particle size ratio 1.07, relative standard deviation 0.1) was melt extruded at 280° C. and solidified with rapid cooling to obtain a nonstretched film.

This nonstretched film was then longitudinally stretched, transverse stretched and then thermosetted, under the conditions indicated in Table 7, to obtain a biaxially oriented film. The characteristics of this film are shown in Table 9.

TABLE 5

| | Copolymerized component | Melt extrusion temperature (°C.) | Longitudinal stretching conditions | | Transverse stretching conditions | | Thermosetting temperature (°C.) |
|---|---|---|---|---|---|---|---|
| | | | Temperature (°C.) | Ratio | Temperature (°C.) | Ratio | |
| Example | | | | | | | |
| 6 | Isophthalic acid 9 mol % | 290 | 115 | 3.0 | 130 | 3.0 | 190 |
| 7 | Isophthalic acid 12 mol % | 280 | " | " | " | " | 180 |
| 8 | Isophthalic acid 15 mol % | 275 | " | 3.1 | " | 3.2 | 185 |
| 9 | Isophthalic acid 18 mol % | 270 | 110 | " | 125 | " | 180 |
| Comparative example | | | | | | | |
| 10 | Isophthalic acid 5 mol % | 295 | 120 | 2.8 | 135 | 2.9 | 225 |
| 11 | Isophthalic acid 22 mol % | 265 | 110 | 3.2 | 125 | 3.3 | 180 |

Example 10 and Comparative example 12

A polyethylene terephthalate copolymer (intrinsic viscosity 0.67) wherein 12 mol % of isophthalic acid was copolymerized and which contained the lubricant indicated in Table 6 was melt extruded at 280° C. and solidified with rapid cooling to obtain a nonstretched film. The nonstretched film was than successively biaxially stretched under the conditions of a longitudinal stretching temperature of 115° C., a longitudinal stretching ratio of 3.0-fold, a transverse stretching temperature of 130° C. and a transverse stretching ratio of 3.0-fold, and then thermosetted at 190° C.

The characteristics of the resulting biaxially oriented film are shown in Table 9.

TABLE 6

| | Lubricant | Average particle diameter (μm) | Addition amount (%) |
|---|---|---|---|
| Example 10 | Titanium dioxide | 0.3 | 0.3 |
| Comparative example 12 | Massive silica | 2.7 | 0.05 |

Comparative examples 13 and 14

A polyethylene terephthalate copolymer (intrinsic viscosity 0.67) wherein 12 mol % of isophthalic acid had been copolymerized and which contained 0.1 wt. %

TABLE 7

| | Longitudinal stretching conditions | | Transverse stretching conditions | | Thermosetting temperature (°C.) |
|---|---|---|---|---|---|
| | Temperature (°C.) | Ratio | Temperature (°C.) | Ratio | |
| Comparative example 13 | 110 | 3.0 | 125 | 3.0 | 205 |
| Comparative example 14 | 100 | 3.8 | 110 | 4.1 | 200 |

Comparative Examples 15 to 18

A polyethylene terephthalate copolymer (intrinsic viscosity 0.67) wherein the component indicated in Table 8 had been copolymerized and which contained 0.1 wt. % of spherical monodisperse silica (particle ratio 1.07, relative standard deviation 0.1) having an average particle diameter of 1.5 μm was melting extruded at the temperature indicated in the table and solidified with rapid cooling to obtain a nonstretched film.

This nonstretched film was longitudinally stretched, transverse stretched and then thermosetted, under the conditions indicated in the table, to obtain a biaxially oriented film 25 μm thick.

The characteristics of this film are shown in Table 9.

TABLE 8

| Comparative example | Copolymerized component | Melt extrusion temperature (°C.) | Longitudinal stretching conditions | | Transverse stretching conditions | | Thermosetting temperature (°C.) |
|---|---|---|---|---|---|---|---|
| | | | Temperature (°C.) | Ratio | Temperature (°C.) | Ratio | |
| 15 | Isophthalic acid 9 mol % | 290 | 115 | 3.0 | 130 | 3.0 | 190 |
| 16 | Isophthalic acid 12 mol % | 280 | " | " | " | " | 180 |

TABLE 8-continued

| Comparative example | Copolymerized component | Melt extrusion temperature (°C.) | Longitudinal stretching conditions | | Transverse stretching conditions | | Thermosetting temperature (°C.) |
|---|---|---|---|---|---|---|---|
| | | | Temperature (°C.) | Ratio | Temperature (°C.) | Ratio | |
| 17 | Isophthalic acid 15 mol % | 275 | " | 3.1 | " | 3.2 | 185 |
| 18 | Isophthalic acid 18 mol % | 270 | 110 | " | 125 | " | 180 |

14 films in total obtained by the above Examples 6 to 10 and Comparative examples 10 to 18 were laminated on both sides of tin-free steel sheets 0.25 mm thick heated to 260° C., respectively. Each of the resulting laminates was cooled with water and cut out into a circle having a diameter of 150 mm. The circle was subjected to three-stage deep drawing processing using a drawing die and a punch to make a side seamless vessel having a diameter of 55 mm (hereinafter abbreviated as can).

This can was tested for (1) deep drawing processability-1, (2) deep drawing processability-2, (3) impact crack resistance and (4) heat embrittlement resistance, in the same manner as above, and for (5) retort resistance as follows.

(5) Retort resistance
Finely deep drawing molded cans were filled with water, subjected to retort treatment at 130° C. for 1 hour using a steam sterilizer and preserved at 50° C. for 30 days. 10 of the cans per each test were then dropped on a polyvinyl chloride floor from a height of 1 m and thereafter subjected to the inside ERV test. The measured value by the test is ○: 0.2 mA or less about all the 10 cans.
Δ: 0.2 mA or more about 1 to 5 cans.

X: 0.2 mA or more about 6 or more cans or cracks are already observed about the film after the dropping.

Evaluation results are shown in Table 9.

TABLE 9

| | Melting point (°C.) | Average particle diameter of the lubricant (μm) | Intrinsic viscosity of the film | Refractive index in the direction of film thickness | Refractive index in the direction of the film plane Max value/ Min value | Sub-peak by DSC (°C.) | Deep drawing processability | | Impact crack resistance | Heat embrittlement resistance | Retort resistance | Integrated evaluation |
|---|---|---|---|---|---|---|---|---|---|---|---|---|
| | | | | | | | 1 | 2 | | | | |
| Example | | | | | | | | | | | | |
| 6 | 235 | 1.5 | 0.631 | 1.514 | 1.646/1.623 | 189 | ○ | ○ | ○ | ○ | ○ | ○ |
| 7 | 228 | 1.5 | 0.612 | 1.524 | 1.641/1.632 | 180 | ○ | ○ | ○ | ○ | ○ | ○ |
| 8 | 222 | 1.5 | 0.602 | 1.534 | 1.639/1.625 | 183 | ○ | ○ | ○ | ○ | ○ | ○ |
| 9 | 215 | 1.5 | 0.610 | 1.540 | 1.636/1.620 | 179 | ○ | ○ | ○ | ○ | ○ | ○ |
| 10 | 229 | 0.3 | 0.609 | 1.527 | 1.643/1.631 | 179 | ○ | ○ | ○ | ○ | ○ | ○ |
| Comparative example | | | | | | | | | | | | |
| 10 | 247 | 1.5 | 0.613 | 1.518 | 1.651/1.640 | 224 | Δ | — | — | — | — | X |
| 11 | 208 | 1.5 | 0.595 | 1.534 | 1.642/1.620 | 180 | ○ | ○ | ○ | Δ | X | X |
| 12 | 228 | 2.7 | 0.598 | 1.528 | 1.641/1.631 | 189 | ○ | X | — | — | — | X |
| 13 | 228 | 1.5 | 0.621 | 1.553 | 1.638/1.615 | 203 | ○ | ○ | Δ | Δ | X | X |
| 14 | 228 | 1.5 | 0.605 | 1.503 | 1.663/1.667 | 199 | X | — | — | — | — | X |
| 15 | 235 | 1.5 | 0.514 | 1.516 | 1.645/1.621 | 190 | ○ | ○ | ○ | ○ | X | X |
| 16 | 228 | 1.5 | 0.512 | 1.525 | 1.642/1.629 | 178 | ○ | ○ | ○ | ○ | X | X |
| 17 | 222 | 1.5 | 0.506 | 1.536 | 1.640/1.619 | 184 | ○ | ○ | ○ | ○ | X | X |
| 18 | 215 | 1.5 | 0.501 | 1.543 | 1.634/1.619 | 179 | ○ | ○ | ○ | ○ | X | x |

From the results in Table 9, it is seen that the films of Examples 6 to 10 are excellent in all of deep drawing processability, impact crack resistance, heat resistance and retort resistance.

Examples 11 to 15 and Comparative examples 19 to 21

A polyethylene terephthalate copolymer (intrinsic viscosity 0.60) wherein the component indicated in Table 10 had been copolymerized and which contained 0.1 wt.% of spherical monodisperse silica having an average particle diameter of 1.5 μm (particle diameter ratio 1.07, relative standard deviation 0.1) was melting extruded at the temperature indicated in the table and solidified with rapid cooling to obtain a nonstretched film.

This nonstretched film was longitudinally stretched, transverse stretched and then thermoset, under the conditions indicated in the table, to obtain a biaxially oriented film 25 μm thick.

The characteristics of this film are shown in Table 13.

TABLE 10

| | Copolymerized component | Melt extrusion temperature (°C.) | Longitudinal stretching conditions | | Transverse stretching conditions | | Thermosetting temperature (°C.) |
|---|---|---|---|---|---|---|---|
| | | | Temperature (°C.) | Ratio | Temperature (°C.) | Ratio | |
| Example | | | | | | | |
| 11 | Isophthalic acid 9 mol % | 290 | 115 | 3.0 | 130 | 3.0 | 195 |
| 12 | Isophthalic | 280 | 115 | 3.0 | 130 | 3.0 | 190 |

TABLE 10-continued

|   | Copolymerized component | Melt extrusion temperature (°C.) | Longitudinal stretching conditions | | Transverse stretching conditions | | Thermosetting temperature (°C.) |
|---|---|---|---|---|---|---|---|
|   |   |   | Temperature (°C.) | Ratio | Temperature (°C.) | Ratio |   |
| 13 | Isophthalic acid 12 mol %<br>Isophthalic acid 15 mol % | 275 | 115 | 3.1 | 130 | 3.2 | 185 |
| 14 | Isophthalic acid 18 mol % | 270 | 110 | 3.1 | 125 | 3.2 | 190 |
| 15 | Sebacic acid 12 mol % | 280 | 95 | 3.0 | 110 | 3.0 | 190 |
| Comparative example |   |   |   |   |   |   |   |
| 19 | None (Homo PET) | 295 | 120 | 2.8 | 135 | 2.9 | 230 |
| 20 | Isophthalic acid 5 mol % | 295 | 120 | 2.8 | 135 | 2.9 | 225 |
| 21 | Isophthalic acid 22 mol % | 265 | 110 | 3.2 | 125 | 3.3 | 180 |

Examples 16 and Comparative example 22

A polyethylene terephthalate copolymer (intrinsic viscosity 0.60) wherein 12 mol % of isophthalic acid had been copolymerized and which contained the lubricant indicated in Table 11 was melting extruded at 280° C. and solidified with rapid cooling to give a nonstretched film. The nonstretched film was successively biaxially stretched under the conditions of a longitudinal stretching temperature of 115° C., a longitudinal stretching ratio of 3.0-fold, a transverse stretching temperature of 130° C. and a transverse stretching ratio of 3.0-fold, and then thermosetted.

The characteristics of the resulting biaxially oriented film are shown in Table 13.

TABLE 11

|   | Lubricant | Average particle diameter (μm) | Addition amount (%) |
|---|---|---|---|
| Example 16 | Titanium dioxide | 0.3 | 0.3 |
| Comparative example 22 | Massive silica | 2.7 | 0.05 |

Comparative examples 23 to 26

A polyethylene terephthalate copolymer (melting point 228° C., intrinsic viscosity 0.60) wherein 12 mol % isophthalic acid had been copolymerized and which contained 0.1 wt. % of spherical monodisperse silica having an average particle diameter of 1.5 μm (particle ratio 1.07, relative standard deviation 0.1) was melting extruded and solidified with rapid cooling to obtain a nonstretched film. This nonstretched film was longitudinally stretched, transverse stretched and thermosetted, under the conditions indicated in Table 12, to obtain a biaxially oriented film.

The characteristics of this film are shown in Table 13.

TABLE 12

| Comparative example | Longitudinal stretching conditions | | Transverse stretching conditions | | Thermosetting temperature (°C.) |
|---|---|---|---|---|---|
|   | Temperature (°C.) | Ratio | Temperature (°C.) | Ratio |   |
| 23 | 115 | 3.0 | 130 | 3.0 | 145 |
| 24 | 110 | " | 125 | " | 205 |
| 25 | 100 | 3.6 | 110 | 3.7 | 200 |
| 26 | " | 3.0 | 110 | 3.0 | 205 |

14 Films in total obtained in the above Examples 11 to 16 and Comparative examples 19 to 26 were laminated on both sides of tin-free steel sheets 0.25 mm thick heated to 260° C., respectively. Each of the resulting laminates was cooled with water and cut out in a circle having a diameter of 150 mm which was then subjected to three-stage deep drawing processing to make a side seamless vessel having a diameter of 55 mm (hereinafter abbreviated as can).

This can was tested for (1) deep drawing processability-1, (2) deep drawing processability-2 (3) impact crack resistance and (4) heat embrittlement resistance, in the same manner as above.

The evaluation results are shown in Table 13.

TABLE 13

|   | Melting point (°C.) | Average particle diameter of the lubricant (μm) | Subpeak by DSC | Refractive index in the direction of film thickness | Refractive index in the direction of the film face Max value/Min value | Occurrence rate of protrusion each having a hollow | Deep drawing processability | | Impact crack resistance | Heat embrittlement resistance | Integrated evaluation |
|---|---|---|---|---|---|---|---|---|---|---|---|
|   |   |   |   |   |   |   | 1 | 2 |   |   |   |
| Example |   |   |   |   |   |   |   |   |   |   |   |
| 11 | 235 | 1.5 | 194 | 1.524 | 1.643/1.630 | 0.20 | ○ | ○ | ○ | ○ | ○ |
| 12 | 228 | 1.5 | 191 | 1.529 | 1.641/1.628 | 0.35 | ○ | ○ | ○ | ○ | ○ |
| 13 | 222 | 1.5 | 185 | 1.534 | 1.638/1.624 | 0.36 | ○ | ○ | ○ | ○ | ○ |
| 14 | 215 | 1.5 | 177 | 1.540 | 1.637/1.621 | 0.38 | ○ | ○ | ○ | ○ | ○ |
| 15 | 229 | 1.5 | 190 | 1.527 | 1.642/1.626 | 0.21 | ○ | ○ | ○ | ○ | ○ |
| 16 | 229 | 0.3 | 190 | 1.531 | 1.643/1.626 | 0.28 | ○ | ○ | ○ | ○ | ○ |
| Comparative |   |   |   |   |   |   |   |   |   |   |   |

TABLE 13-continued

| | Melting point (°C.) | Average particle diameter of the lubricant (μm) | Subpeak by DSC | Refractive index in the direction of film thickness | Refractive index in the direction of the film face Max value/ Min value | Occurrence rate of protrusion each having a hollow | Deep drawing process-ability 1 | Deep drawing process-ability 2 | Impact crack resis-tance | Heat embrit-tlement resis-tance | Inte-grated evalua-tion |
|---|---|---|---|---|---|---|---|---|---|---|---|
| example | | | | | | | | | | | |
| 19 | 260 | 1.5 | 229 | 1.514 | 1.655/1.643 | 0.05 | x | | Not measured | | X |
| 20 | 247 | 1.5 | 223 | 1.518 | 1.650/1.638 | 0.08 | △ | | Not measured | | X |
| 21 | 208 | 1.5 | 179 | 1.534 | 1.640/1.619 | 0.35 | ○ | ○ | ○ | X | X |
| 22 | 228 | 2.7 | 189 | 1.528 | 1.641/1.630 | 0.33 | ○ | X | Not measured | | X |
| 23 | 228 | 1.5 | 144 | 1.520 | 1.639/1.632 | 0.34 | ○ | ○ | △ | X | X |
| 24 | 228 | 1.5 | 203 | 1.553 | 1.637/1.614 | 0.30 | ○ | ○ | X | X | X |
| 25 | 228 | 1.5 | 199 | 1.512 | 1.658/1.659 | 0.03 | X | | Not measured | | X |
| 26 | 229 | 1.5 | 204 | 1.547 | 1.641/1.615 | 0.08 | ○ | ○ | △ | X | X |

From the results of Table 13, it is seen that the films of Examples 11 to 16 are excellent in all of deep drawing processability, impact crack resistance and heat resistance.

As shown in the above, examples, the polyester film of this invention for metal sheet lamination drawing and processing are excellent in deep drawing processability, and impact resistance and heat resistance after can preparation, and further retort resistance, in molding a metal can be laminating the film on a metal sheet and then subjecting the laminate to can preparation processing, for example deep drawing processing, and thus the film is extremely useful for metal vessels.

What we claim is:

1. A polyester film for metal sheet lamination drawing and processing which comprises a co-polyester containing a solid lubricant having an average particle diameter of 2.5 μm or less and the co-polyester having an upper melting point of 210° to 245° C.; and wherein the refractive index in the direction of film thickness is 1.505 to 1.550, the refractive index in the direction of the film plane is 1.61 to 1.66 in all directions, a lower melting point as determined by differential scanning colorimetry of 150° to 205° C., and protrusions on the film surface satisfy the formula $$0.1 \leq Nd/N \leq 0.5$$

wherein N is the number of all the protrusions on the film surface and Nd is the number of the protrusions each containing the lubricant as its nucleus and having a sunken hollow around it.

2. The polyester film of claims 1 wherein the lubricant has an average particle diameter of 2.5 μm or less and a particle size ratio (major axis/minor axis) of 1.0 to 1.2.

* * * * *